US007703962B2

(12) United States Patent
Delourme et al.

(10) Patent No.: US 7,703,962 B2
(45) Date of Patent: Apr. 27, 2010

(54) LIGHTING DEVICE FOR A VEHICLE WITH A REFLECTOR COMPATIBLE WITH SEVERAL MODELS OF LAMP

(75) Inventors: Jean-François Delourme, Bobigny (FR); Nicolas Simmet, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 407 days.

(21) Appl. No.: 11/177,190

(22) Filed: Jul. 7, 2005

(65) Prior Publication Data

US 2006/0007695 A1 Jan. 12, 2006

(30) Foreign Application Priority Data

Jul. 9, 2004 (FR) .................................. 04 07726

(51) Int. Cl.
*B60Q 1/00* (2006.01)

(52) U.S. Cl. ....................... 362/548; 362/263; 362/388; 362/429; 362/476; 362/507; 362/549; 439/217; 439/218; 439/220; 439/236

(58) Field of Classification Search ................. 362/263, 362/512, 549, 365, 388, 429, 476, 507, 548, 362/652, 655, 656, 658, 659, 647; 439/217, 439/218, 220, 236

See application file for complete search history.

(56) References Cited

U.S. PATENT DOCUMENTS 5,057,982 A * 10/1991 Hanami ...................... 362/646
6,260,986 B1 * 7/2001 Helbig et al. ............... 362/640
2002/0060912 A1 5/2002 Becker et al.
2003/0128550 A1 7/2003 Ui

FOREIGN PATENT DOCUMENTS

FR 2 474 143 7/1981
FR 2 499 674 8/1982
GB 2092736 A * 8/1982
JP 07254394 * 3/1995

OTHER PUBLICATIONS

French Search Report dated Feb. 22, 2005.

* cited by examiner

*Primary Examiner*—Sandra L O'Shea
*Assistant Examiner*—Mary Zettl
(74) *Attorney, Agent, or Firm*—Locke Lord Bissell & Liddell

(57) ABSTRACT

A lighting device usable in a vehicle, the lighting device comprising at least a reflector and a lamp, wherein the reflector further includes an orifice. The lamp may be mounted in a lamp holder, the lamp holder being coupled to the reflector and positioned at least partly in the office. In addition, the orifice located within the reflector may be configured to work with a variety of lamp holders, including at least a discharge bulb lamp holder and a halogen bulb lamp holder.

7 Claims, 4 Drawing Sheets

LIGHTING DEVICE FOR A VEHICLE WITH A REFLECTOR COMPATIBLE WITH SEVERAL MODELS OF LAMP

FIELD OF THE INVENTION

The invention concerns a lighting device for a vehicle, in which the reflector is adapted to receive several types of lamp holder receiving different models of lamp, such as halogen lamps and discharge lamps. This reflector comprises an orifice for mounting the lamp holder whose shape is adapted to receive both a lamp holder for a halogen lamp and a lamp holder for a discharge lamp.

The invention finds applications in the automobile field and in particular in the field of lighting for motor vehicles. It finds in particular applications in the installation and fixing of lamp holders on a headlight reflector.

PRIOR ART

At the present time, lighting devices for vehicles are provided with light sources which may be of various kinds. In particular, the lighting devices, or headlights, situated at the front of the vehicles are each equipped with at least one light source which may be a halogen lamp or a discharge lamp.

In a headlight, whatever the model of lamp, the latter is mounted so as to be placed inside a reflector. For this purpose, the lamp is mounted on a lamp holder, itself fixed to the reflector. The lamp holder provides a mechanical connection between the lamp and the reflector. In the case of a discharge lamp, also referred to as a xenon lamp, a high-voltage module provides the electrical supply to the lamp.

Amongst discharge lamps, also referred to as xenon lamps, there exist two types of lamp, referred to as D1 lamps and D2 lamps, currently used in headlights. Each of these lamps comprises a discharge bulb fixed, removably or not according to the model, to the high-voltage module at a bulb base. The discharge lamp is fixed to a lamp holder. The discharge bulb is placed at the heart of an optical reflector by means of a lamp holder. The role of this lamp holder is to support the bulb and to centre the bulb within the reflector. For this purpose, the reflector is provided with a passage orifice through which the lamp holder partly passes. The lamp holder is securely fixed to the reflector at the time of assembly of the headlight.

Amongst halogen lamps, there currently exist many types of lamp, in particular lamps such as H1, H4, H7, H10, H11, HB3 and HB4, currently used in headlights. The invention is in particular advantageously applied to lamps of the H7 and H11 type. Each of these lamps comprises a halogen bulb fixed to a lamp holder. The halogen bulb is placed at the heart of an optical reflector by means of the lamp holder. The role of this lamp holder is to support the bulb and to centre the bulb within the reflector. For this purpose, the reflector is provided with a passage orifice, through which the lamp holder partly passes. The lamp holder is securely fixed to the reflector at the time of assembly of the headlight.

Having regard to the fact that a halogen lamp and a discharge lamp have completely different shapes, a lamp holder for a halogen lamp has a different shape from a lamp holder for a discharge lamp.

Consequently, at the present time, each reflector comprises an orifice adapted to receive a particular lamp holder, that is to say a lamp holder for a halogen lamp or a lamp holder for a discharge lamp. In other words, each reflector is manufactured for the purpose of receiving a particular model of lamp.

FIG. 1 depicts an example of a front view of a reflector intending to receive a lamp holder for a discharge lamp, hereinafter referred to as a discharge or xenon lamp holder. In this FIG. 1, the reflector 1 containing an orifice 2 for receiving a discharge lamp holder can be seen. This orifice 2 has a rectangular base shape, where some of the sides comprise an arc of a circle. More precisely, this orifice comprises two lengths 3 and 4 and two widths 5 and 6. "Lengths" means the sides of the orifice 2 with the largest dimensions and "widths" the sides with the smallest dimensions.

The lengths 3 and 4 are symmetrical with respect to a vertical axis Y. The length 3 comprises a first rectilinear zone 3*a* and a second rectilinear zone 3*c*. A curved zone 3*b* connects to the first rectilinear zone 3*a* and the second rectilinear zone 3*c*. The curved zone 3*b* forms an arc of a circle. Symmetrically, the length 4 comprises two rectilinear zones 4*a* and 4*c* and a curved zone 4*b*. The curved zones 3*b* and 4*b* of the lengths 3 and 4 are two arcs of a circle of one and the same circle of centre O. In this example of an orifice 2, the lengths 3 and 4 have a size of 15 millimeters.

The widths 5 and 6 are asymmetric. The width 5, situated on the top part of the reflector, comprises a central rectilinear zone 5A, two lateral rectilinear zones 5*b* and 5*c*, two circular zones or ones in the form of portions of an arc of a circle, 5*d* and 5*e*, and two vertical zones 5*f* and 5*g*. The central rectilinear zone 5*a* has a size of 6 millimeters. The lateral rectilinear zones 5*b* and 5*c* form right angles with the first rectilinear zones 3*a* and 4*a* of the lengths 3 and 4. The circular or curved zones 5*d* and 5*e* connect the lateral zones 5*b* and 5*c* with the vertical zones. These vertical zones 5*f* and 5*g* connect the zones in the form of portions of an arc of a circle 5*d* and 5*e* with the central zone 5*a*. The width 5 has a total dimension (between the two ends of the lateral zones 5*b* and 5*c*) of 14 millimeters.

The width 6, situated at the bottom part of the reflector 1, comprises a curved central zone 6*a* and two rectilinear zones 6*b* and 6*c*. The central zone 6*a* forms a semi-circle. The rectilinear zones 6*b* and 6*c* connect the lengths 3 and 4 to the central zone 6*a*. These rectilinear zones 6*b* and 6*c* form right angles with the second rectilinear zones 3*c* and 4*c* of the lengths 3 and 4.

Such an orifice 2 is intended to receive a lamp holder for a discharge lamp. An example of a lamp holder for a discharge lamp D1 is shown in FIG. 1B. More precisely, this FIG. 1B shows a back view of such a lamp holder, that is to say a view from the face opposite to the reflector. The lamp holder 7 comprises a fixing section 8 intended to be introduced into the orifice 2 of the reflector 1. This fixing section 8 comprises, on its contour, fixing lugs intended to be crimped on the receiver. In other words, the lamp holder 7 is fixed to the reflector 1 by means of fixing lugs introduced inside the reflector via the orifice 2; these fixing lugs are then crimped on the internal face of the reflector around the orifice 2. The lamp holder 7 is thus kept fixed to the reflector. In the example in FIG. 1B, the lamp holder 7 comprises three fixing lugs 8*a*, 8*b* and 8*c*. The fixing lugs 8*a* and 8*c* are symmetrical with respect to a vertical axis Y. The fixing lug 8*b* is situated perpendicular to the lugs 8*a* and 8*c* in the top part of the lamp holder. This fixing lug 8*b* is intended to be crimped along the width 5 of the orifice 2. The fixing lugs 8*a* and 8*c* are intended to be crimped along respectively lengths 4 and 3 of the orifice 2.

FIG. 2A depicts an example of a reflector orifice intended to receive a lamp holder for a halogen lamp, hereinafter referred to as a halogen lamp holder. In this example, the orifice 2 is substantially circular. This orifice 2 of the reflector 1 is intended to receive a lamp holder of the type depicted in FIG. 2B. This lamp holder 17 comprises a fixing section 9 with a substantially round shape. This fixing section 9 comprises four fixing lugs, 9*a*, 9*b*, 9*c* and 9*d*. These fixing lugs are intended to be crimped along the contour of the orifice 2.

As will be understood in the light of FIGS. 1A, 1B, 2A and 2B, the shape of the orifice 2 of a reflector 1 is specifically adapted to receive a particular model of lamp holder, namely a discharge lamp holder or a halogen lamp holder. This is because the orifice 2 of a reflector 1 intended to receive a halogen lamp holder (FIG. 2A), because of its circular shape, cannot receive a discharge lamp holder, where the shape of the fixing section comprises right angles. For a discharge lamp holder to be able to enter the orifice 2 of a reflector for a halogen lamp, it is essential for the fixing cross section of the discharge lamp holder to be smaller than the width of the orifice of the reflector for a halogen lamp; however, in this case, the fixing lugs of the discharge lamp holder are too far away from the contour of the orifice of the reflector for a halogen lamp to provide the fixing of the discharge lamp holder.

Likewise, if a halogen lamp holder passes through the orifice 2 of a reflector for a discharge lamp, then the fixing lugs of the halogen lamp holder are too far away from the widths of the orifice of the reflector for a discharge lamp to provide the fixing of the halogen lamp holder.

The current situation requires for the manufacturers of vehicles and for the persons responsible for maintaining vehicles to have available to them halogen lamp holders and reflectors for halogen lamp holders as well as discharge lamp holders and reflectors for discharge lamp holders. However, it is known that the reflectors of headlights of the elliptical type all have substantially the same shape, whatever the model of lamp holder, except for the lamp holder reception orifice, the shape of which is adapted to each model of lamp holder.

In addition, in the case of halogen lamp holders, different reflectors must be provided according to the direction of the traffic. This is because, in the case of traffic on the right (for example in France), the filament in the bulb is offset to the right with respect to the optical axis. On the other hand, in the case of traffic on the left (for example in Great Britain), the filament in the bulb is offset to the left with respect to the optical axis. The orifice of the reflector is therefore not the same whether the lamp holder supports a lamp provided for traffic on the right or a lamp provided for traffic on the left.

DISCLOSURE OF THE INVENTION

The aim of the invention is precisely to remedy the drawbacks of the techniques disclosed above. To this end the invention proposes a headlight for a vehicle in which the reflector has an orifice adapted to various models of lamp holder. Thus the reflector of the headlight of the invention can receive both a lamp holder for a halogen lamp or a lamp holder for a discharge lamp. The reflector is therefore common for various types of lamp.

More precisely, the invention concerns a lighting device for a vehicle comprising:

- a reflector comprising an orifice,
- a lamp,
- a lamp holder in which the lamp is mounted, the said lamp holder being placed, at least partly, in the orifice and fixed to the reflector, with the orifice which is adapted to receive a lamp holder for a xenon lamp and a lamp holder for a halogen lamp.

The invention can also comprise one or more of the following characteristics:

- the lamp holder for a halogen lamp comprises at least two different stable positions in the reflector, in particular a first stable position for traffic on the right and a second stable position for traffic on the left, the change from one position to another being able to take place by rotation of the lamp holder through 180° in the orifice of the reflector;
- the orifice has the form of a rectangular base in which a circle is inscribed, the orifice comprising two lengths at least partly rounded and two widths at least partly rectilinear;
- the two lengths of the orifice are identical in shape and size;
- the two widths of the orifice are different;
- each lamp holder preferably comprises at least four fixing lugs, crimped on a contour of the orifice;
- at least two of the fixing lugs are symmetrical.

The invention also concerns a vehicle comprising such a lighting device.

DETAILED DESCRIPTION OF EMBODIMENTS OF THE INVENTION

Figure 3:
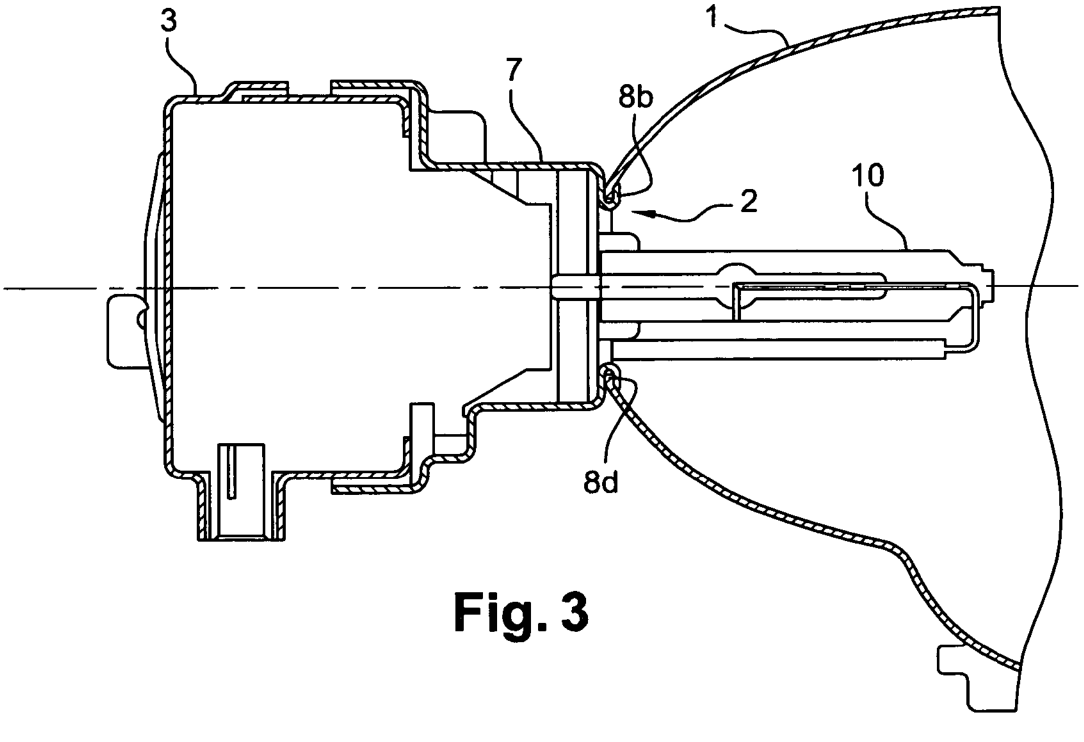
FIG. 3 depicts schematically a lamp holder for a discharge lamp mounted on a reflector according to the invention.

FIG. 3 depicts a view in section of a lamp holder of a discharge lamp mounted on a reflector according to the invention.

More precisely this FIG. 3 shows a discharge lamp 10 mounted on a lampholder 7. This lampholder 7 provides the connection between the bulb and the discharge lamp 10 and the high-voltage module 3. It also provides the fixing of the high-voltage module 3 and lamp 10 on the reflector 1. This fixing is effected by means of fixing lugs, of which only the lugs 8B and 8D are visible in this figure. These fixing lugs 8B and 8D are introduced, via the orifice 2, inside the reflector 1 and crimped on the contour of the orifice 2, that is to say on the internal wall of the reflector 1, in order to provide the fixing of the lamp holder with the reflector 1. Lamp 10 is consequently fixed inside the reflector 1 by means of the lampholder 7.

It should be noted that the principal of mounting the lampholder on the reflector is the same when the lampholder is adapted to receive a halogen lamp.

Figure 1A:
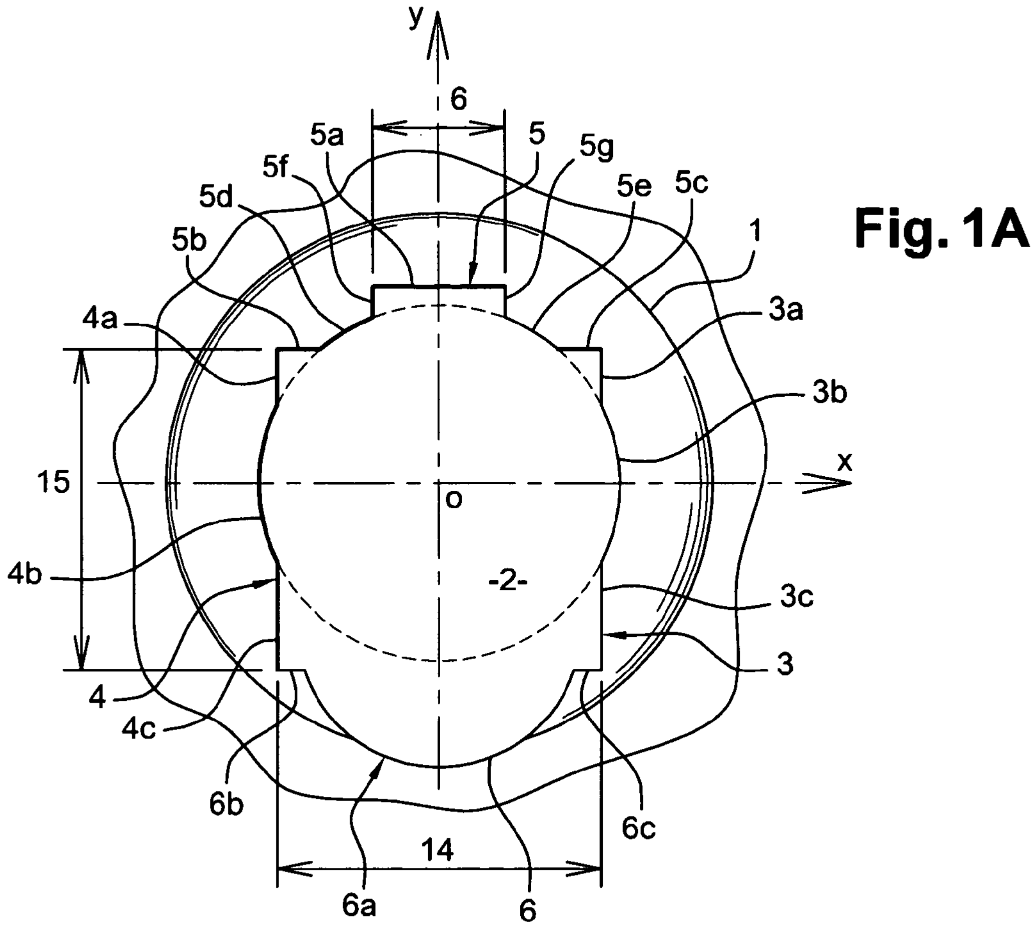
FIGS. 1A and 1B, already described, depict respectively a reflector and a lamp holder for a discharge lamp of the prior art.
Figure 1B:
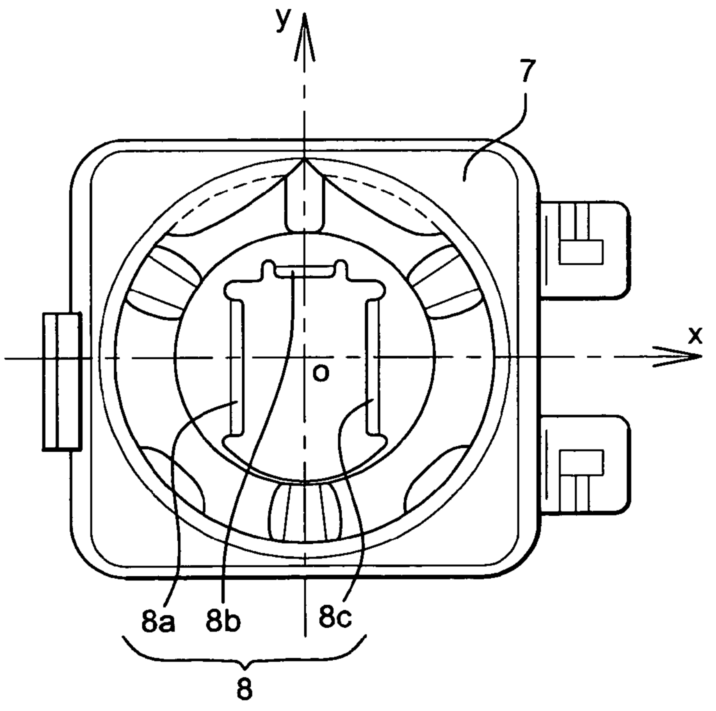
Figure 2A:
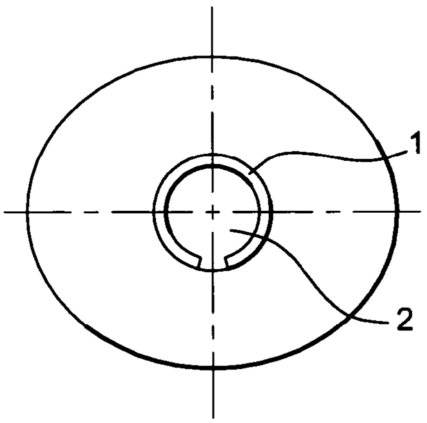
FIGS. 2A and 2B, already described, depict respectively a receiver and a lamp holder for a halogen lamp of the prior art.
Figure 2B:
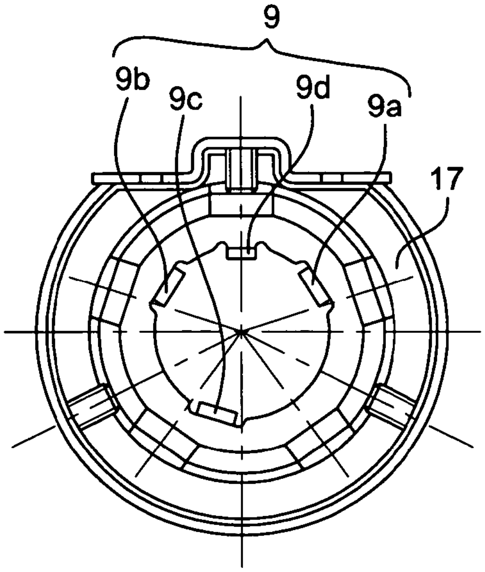
Figure 4:
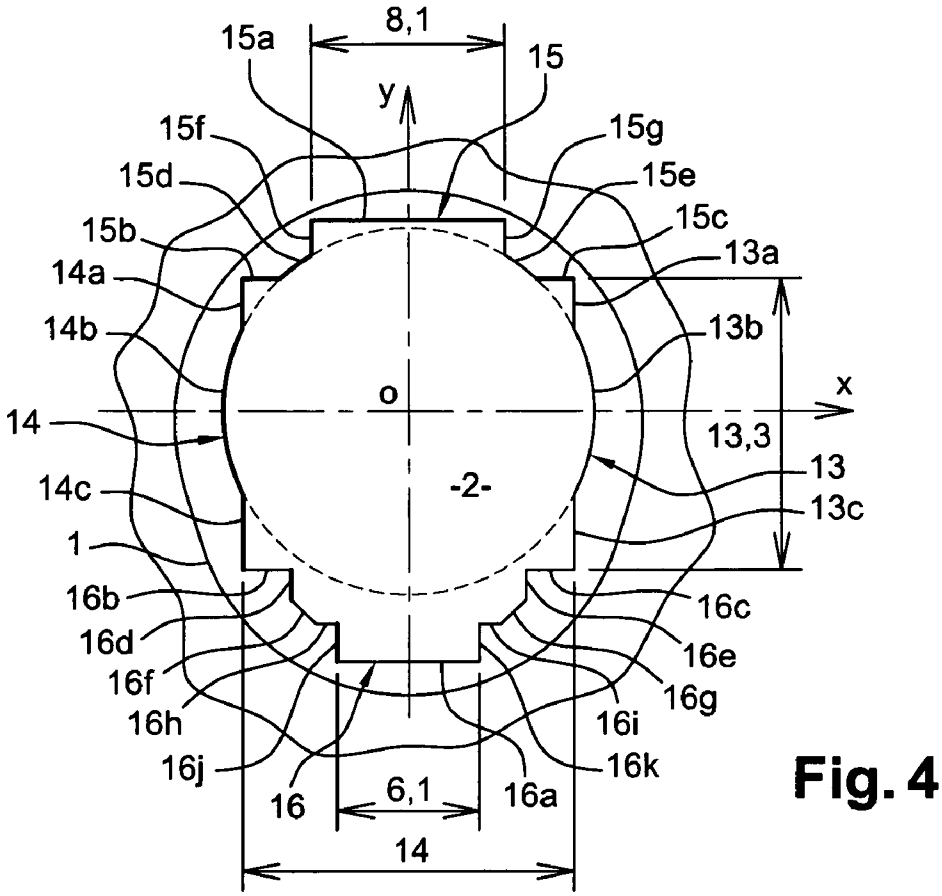
FIG. 4 depicts a front view of the reflector according to the invention.

FIG. 4 depicts in more detail the orifice 2 of FIG. 1. More precisely, FIG. 4 shows a front view of the reflector of the invention. This reflector 1 comprises the orifice 2, centred in a reference frame OXY. The orifice 2, in the invention, comprises two lengths 13 and 14 and two widths 15 and 16. "Lengths" of the orifice 2 means the vertical sides of the orifice, in the representation in FIG. 4. "Widths" of the orifice means the horizontal sides of the orifice, in the representation in FIG. 4.

The orifice 2 has a rectangular base shape, in which a circle of centre O is inscribed.

More precisely, in the invention, the lengths 13 and 14 are identical and symmetrical with respect to the axis Y. The length 13 comprises a first rectilinear zone 13*a* and a second rectilinear zone 13*c*. A curved zone 13*b* connects the first rectilinear zone 13*a* to the second rectilinear zone 13*c*. The curved zone 13*b* forms an arc of a circle. Symmetrically, the length 14 comprises two rectilinear zones 14*a* and 14*c* and a curved zone 14*b*. The curved zones 13*b* and 14*b* of the lengths 13 and 14 are two arcs of a circle of the same circle of centre O.

In the preferred embodiment of the invention, the lengths 13 and 14 have a size of 13.3 mm. These lengths are centred on the axis Y of the lamp. The shape of these lengths 13 and 14 is substantially the same as that of the lengths 3 and 4 of the reflector for a discharge lamp holder of the prior art but their dimensions are different. This because the lengths 13 and 14 are shorter than the lengths 3 and 4 of the prior art. Thus a discharge lampholder according to the prior art cannot be introduced into the orifice of a reflector according to the invention. This difference in dimensions has a safety role in the device of the invention.

The widths 15 and 16 are different. The width 15, situated on the top part of the reflector 1, comprises a central rectilinear zone 15*a*, two lateral rectilinear zones 15*b* and 15*c*, two circular zones 15*d* and 15*e* and two vertical zones 15*f* and 15*g*. The lateral rectilinear zones 15*b* and 15*c* form right-angles with the first rectilinear zones 13*a* and 14*a* of the lengths 13 and 14. The circular zones (or zones in portions of an arc of a circle or curve) 15*d* and 15*e* connect the lateral zones 15*b* and 15*c* with the vertical zones. These vertical zones 15*f* and 15*g* connect the circular zones 15*d* and 15*e* with the central zone 15*a*.

The width 16, situated at the bottom part of the reflector 1, has a very broken up form, forming two kinds of steps joining at a central zone 16*a*. More precisely, the width 16 comprises a central rectilinear zone 16*a*, two lateral rectilinear zones 16*b* and 16*c*, two lateral vertical zones 16*d* and 16*e*, two oblique zones 16*f* and 16*g*, two intermediate rectilinear zones 16*h* and 16*i* and two central vertical zones 16*j* and 16*k*. The lateral rectilinear zones 16*b* and 16*c* form right-angles with the rectilinear zones 13*c* and 14*c* of the lengths 13 and 14. The lateral vertical zones 16*d* and 16*e* connect the lateral rectilinear zones 16*b* and 16*c* with the oblique zones 16*f* and 16*g*. The oblique zones 16*f* and 16*g* may, according to different example embodiments, be rectilinear portions or curved portions of the arc of a circle type. The intermediate rectilinear zones 16*h* and 16*i* connect the oblique zones 16*f* and 16*g* with the central vertical zones 16*j* and 16*k*. The two central vertical zones 16*j* and 16*k* are connected to each other by the central rectilinear zone 16*a*.

The width 15 has a total size (between the two ends of the lateral zones 15*b* and 15*c*) of 14 mm. The central rectilinear zone 15*a* has a size of 8.1 mm. The central rectilinear zone 16*a* has a size of 6.1 mm. The widths 15 and 16 are therefore different in size and shape. In this way, a discharge lamp cannot be mounted upside down on the reflector. Only one discharge lampholder position is therefore permitted in the orifice of the reflector of the invention. In other words, the asymmetry of the orifice provides a role of positive location.

Thus the shape of the orifice 2 of the device of the invention ensures perfect geometric positioning by asymmetry of shape.

Figure 5:
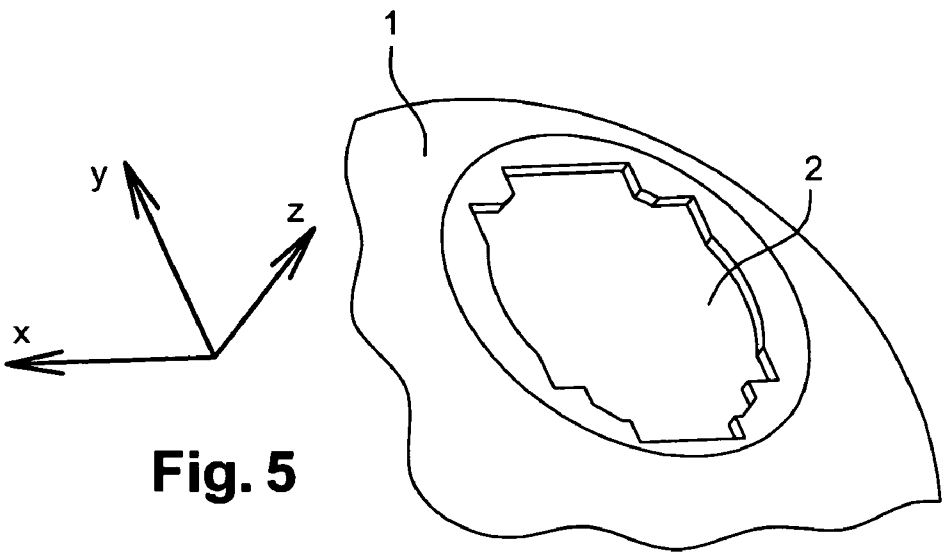
FIG. 5 depicts a respective view of the rear of a reflector according to the invention.
Figure 6A:
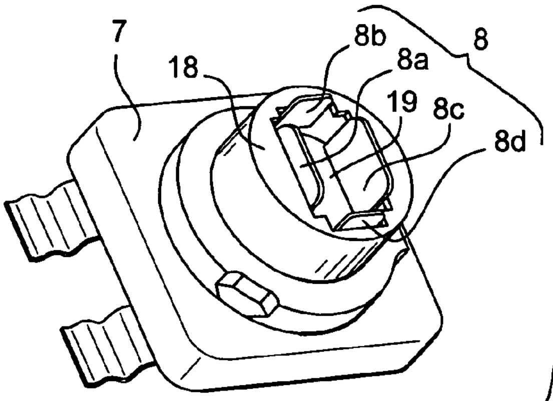
FIGS. 6A and 7A depict a perspective view respectively of a lamp holder for a discharge lamp and of a lamp holder for a halogen lamp according to the invention.

FIG. 5 depicts a perspective view of the rear of a reflector 1 according to the invention. This FIG. 5 shows that the reflector 1 has a rounded shape and the orifice 2 is produced in the bottom of the reflector. This orifice 2 is intended to receive a lampholder like those depicted in FIGS. 6*a* and 7*a*. More precisely, FIG. 6*a* shows a perspective view of a lampholder for a discharge, or xenon, lamp. According to the invention, this lampholder 7 comprises several sections and, in particular, a top section 18. This top section 18 comprises an opening 9 in which the discharge lamp is mounted. This opening 9 is substantially rectangular. The top section 18 also comprises a fixing section 8. It is this fixing section 8 which is introduced into the orifice 2 of the reflector. This fixing section 8 comprises fixing lugs 8*a*, 8*b*, 8*c* and 8*d*. These fixing lugs are preferably four in number. They are distributed on the four sides of the opening 19. The fixing lugs 8*a* and 8*c* have identical sizes. The fixing lugs 8*b* and 8*d* have different sizes. The four fixing lugs of the lampholder 9 come to be placed along the two lengths 13 and 14 and the two widths 15 and 16 of the orifice 2. In particular the lugs 8*a* and 8*c* are placed along the lengths 13 and 14. The lug 8*b* is placed along the width 15 and the lug 8*d* along the width 16 of the orifice 2.

Figure 6B:
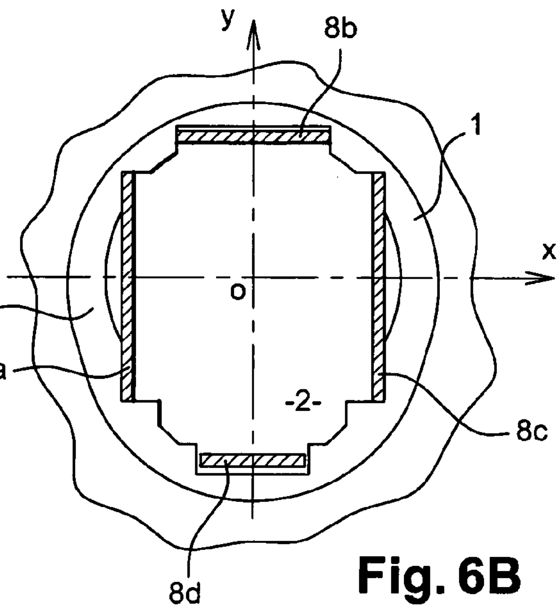
FIGS. 6B and 7B depict a front view of a reflector on which there are mounted respectively a discharge lamp holder and a halogen lamp holder.

FIG. 6*b* shows the fixing section of the lampholder 7 after introduction into the orifice 2 of the reflector. FIG. 6*b* therefore shows the reflector in a front view after introduction of the lampholder and before crimping of the fixing lugs. In other words, the four fixing lugs 8*a*, 8*b*, 8*c* and 8*d* can be seen in this FIG. 6*b* in the orifice 2. The size of the fixing lugs 8*a* and 8*c* is substantially smaller than that of the lengths 13 and 14 of the orifice 2 in order to be able to be placed along these lengths with minimum clearance. The same applies to the lug 8*b* and the width 15 and to the lug 8*d* and width 16.

In general terms, the size of the fixing lugs in the device of the invention is designed to be sufficiently small to permit their introduction into the orifice of the reflector but sufficiently great to allow the fixing of the lampholder on the reflector.

It will be understood that, when the fixing lugs 8*a* to 8*d* have been crimped against the internal wall 20 of the reflector 1, the lamp is fixed to the reflector. It will also be understood that, since the lug 8*b* is longer than the lug 8*d*, the lampholder 7 cannot be introduced upside down into the orifice 10.

Figure 7A:
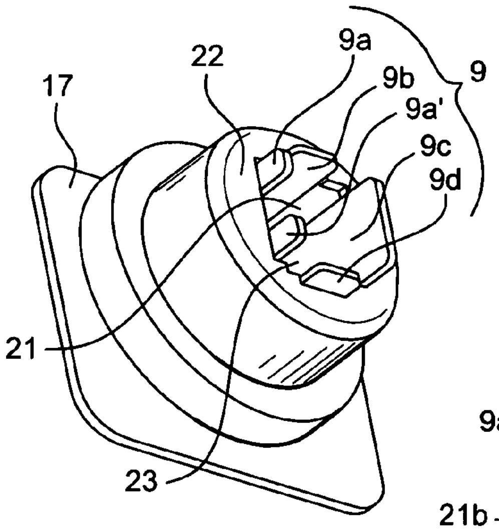
Figure 7B:
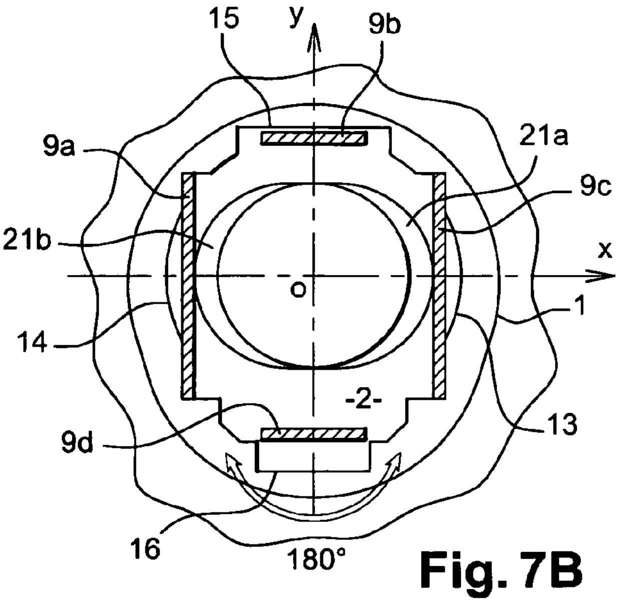

FIG. 7*a* depicts a perspective view of a lampholder 17 for a halogen lamp. This lampholder 17 comprises several sections and, in particular, a top section 22. This top section 22 comprises an opening 21 in which the halogen lamp is mounted. This opening 21 is substantially rectangular. The top section 22 also comprises a fixing section 9. It is this fixing section 9 that is introduced into the orifice 2 of the reflector. This fixing section 9 comprises fixing lugs 9*a*, 9*b*, 9*c* and 9*d*. These fixing lugs can be four in number. They are distributed over the four sides of the opening 21. In the embodiment in FIG. 7*a*, two parts of fixing lugs 9*a* and 9*a*', of small size, are placed on the same side of the opening 21. These two lug parts 9*a* and 9*a*' may be independent, as shown in FIG. 7*a*. They may also be joined in order to form a single lug as shown in FIG. 7*b*. Naturally, for practical reasons, the other fixing lugs of the lampholder can also be divided into two parts. The fixing lugs 9*a* and 9*c* preferably have identical sizes. The fixing lugs 8*a* and 8*c* can have identical or different sizes, but with a size less than the size of the lengths 13 and 14 of the orifice 2.

FIG. 7*b* depicts the fixing section 9 of the lampholder 17 after introduction into the orifice 2 of the reflector. FIG. 7*b* therefore shows the reflector according to a front view after introduction of the lampholder and before crimping of the fixing lugs. In other words, the four fixing lugs 9*a*, 9*b*, 9*c* and 9*d* in the orifice 2 can be seen in this FIG. 7*b*. The size of the fixing lugs 8*a* and 8*c* is substantially smaller than that of the lengths 13 and 14 of the orifice 2 in order to be able to be placed along these lengths with minimum clearance. The same applies to the lugs 9$b$ and 9$d$ with the widths 15 and 16.

As with the discharge lampholder, the size of the fixing lugs in the device of the invention is designed to be sufficiently small to enable them to be introduced into the orifice of the reflector but sufficiently large to allow the fixing of the lampholder on the reflector.

It will be understood that, when the fixing lugs 9$a$ to 9$d$ have been crimped against the internal wall 20 of the reflector 1, the lampholder 17 is fixed to the reflector 1. It will also be understood that, since the lugs 9$b$ and 9$d$ are of the same length, the lampholder 17 can be inserted in one direction or the other in the orifice 2. This is because, as has been explained previously, according to the positioning of the filament in the halogen bulb, a halogen lamp can be used for traffic on the right or traffic on the left. In the invention, the lampholder 17 can be placed in one direction in the reflector (for example with the fixing lug 9$b$) in the top part of the orifice 2) or in the opposite direction in the reflector (that is to say with the fixing lug 9$b$ in the bottom part of the orifice). In other words, by making the lampholder 17 undergo a rotation of 180° (in the direction of the arrow), it is possible to make the lighting device pass from a position for traffic on the right to a position for traffic on the left. In FIG. 7$b$, a circle 21$a$ represents the position of the lamp in the reflector for traffic on the right and a circle 21$b$ the position of this same lamp for traffic on the left.

As explained previously, in the preferred embodiment of the invention, the discharge and halogen lampholders comprise four fixing lugs. These four lugs on the one hand allow centring of the lampholder in the orifice and on the other hand supplement the system of positive location of the widths of the orifice. In addition, these four fixing lugs improve the resistance to vibration of the lighting device. In particular, it makes it possible to provide vibration tests which meet the high specifications required for use on heavy vehicles.

A great advantage of the invention is that the reflector 1 is compatible with halogen lamps and xenon lamps. Moreover, in the case of halogen lamps the reflector 1 of the invention can be used equally well for traffic on the right and for traffic on the left. For this purpose it suffices to modify the position of the lampholder 17 in the orifice 2 of the reflector 1.

What is claimed is:

1. A lighting device for a vehicle, comprising:

a reflector comprising an orifice;

a lamp; and a lamp holder in which the lamp is mounted, the lamp holder being at least partly placed in the orifice, the lamp holder comprising fixing lugs fixed to the reflector;

wherein the orifice has a rectangular base shape in which a circle is inscribed, the shape of the orifice comprising two lengths at least partly rounded and two widths at least partly rectilinear, and further wherein the orifice is shaped to receive the fixing lugs of a lamp holder for a discharge lamp and the fixing lugs of a separate lamp holder for a halogen lamp, the fixing lugs of the discharge lamp holder and the fixing lugs of the halogen lamp holder having different shapes.

2. The device of claim 1, wherein the lamp holder for a halogen lamp comprises two different stable positions in the reflector, in particular a first stable position for traffic on the right and a second stable position for traffic on the left, by rotation of the lamp holder through 180° in the orifice of the reflector.

3. The device of claim 1, wherein the two lengths are identical in shape and size.

4. The device of claim 1, wherein the two widths are different.

5. The device of claim 1, wherein each lamp holder comprises at least four fixing lugs, crimped on a contour of the orifice.

6. The device of claim 5, wherein at least two of the fixing lugs are symmetrical.

7. A motor vehicle, comprising a lighting device according to claim 1.

* * * * *